United States Patent [19]
Maatman et al.

[11] Patent Number: 6,064,858
[45] Date of Patent: May 16, 2000

[54] GROUND-STATION SYSTEM, GROUND STATION, DEVICE, METHOD

[75] Inventors: Johannes Jozeph Maatman, The Hague; Peter Zijlema, Warmond, both of Netherlands

[73] Assignee: Koninklijke PTT Nederland N.V., Netherlands

[21] Appl. No.: 08/945,465

[22] PCT Filed: Jun. 10, 1996

[86] PCT No.: PCT/EP96/02534

§ 371 Date: Nov. 13, 1997

§ 102(e) Date: Nov. 13, 1997

[87] PCT Pub. No.: WO97/01225

PCT Pub. Date: Jan. 9, 1997

[30] Foreign Application Priority Data

Jun. 22, 1995 [NL] Netherlands ............................ 1000628

[51] Int. Cl.[7] .................................................. H04B 7/185
[52] U.S. Cl. ............................ 455/12.1; 455/412; 455/427
[58] Field of Search ............................... 455/12.1, 13.1, 455/13.2, 427, 428, 429, 412, 414, 433, 445

[56] References Cited

U.S. PATENT DOCUMENTS 5,070,537  12/1991  Ohira et al. ............................. 455/12.1
5,509,004   4/1996  Bishop, Jr. et al. .................... 455/12.1

FOREIGN PATENT DOCUMENTS 2275588A    8/1994  United Kingdom .
WO 92/00636  1/1992  WIPO .
WO 92/19050 10/1992  WIPO .

Primary Examiner—Nguyen Vo
Assistant Examiner—Sam Bhattacharya
Attorney, Agent, or Firm—Michaelson & Wallace; Peter L. Michaelson

[57] ABSTRACT

Known ground-station systems offer users of mobile stations a different standard procedure for each ground station. By through-coupling an aerial of the ground station to a processing arrangement of the ground station in response to a first identification code, satellite signals comprising the first identification code being processed via the processing arrangement of the ground station, and by through-coupling the aerial via a link to another processing arrangement of another ground station in response to a second identification code, satellite signals comprising the second identification code not being processed via the processing arrangement of the ground station, but only being transmitted by the ground station via the link to the other processing arrangement of the other ground station in order to be processed subsequently by the other processing arrangement at the site of the other ground station, the result is achieved that a user of a mobile station deals with one standard procedure over the entire world and a "global image" is created.

6 Claims, 1 Drawing Sheet

GROUND-STATION SYSTEM, GROUND STATION, DEVICE, METHOD

BACKGROUND OF THE INVENTION

1. Field of the Invention

The invention relates to a ground-station system comprising a first ground station which is provided with at least one first aerial for the reception of a first satellite signal comprising an identification code, a first processing arrangement comprising a first input, coupled to the first aerial, for the reception and processing of the first satellite signal and comprising a first output for the generation of a first outgoing signal, and a first detection arrangement for detecting the identification code, and comprising a second ground station which is provided with at least one second aerial for the reception of a second satellite signal comprising an identification code, a second processing arrangement comprising a second input, coupled to the second aerial, for the reception and processing of the second satellite signal and comprising a second output for the generation of a second outgoing signal, and a second detection arrangement for detecting the identification code.

2. Description of the Prior Art

Such a ground-station system is generally known and makes use, for example, of four satellites which are each situated at such a height above the earth's surface and are each situated at such a degree of longitude and degree of latitude that an attempt can be made to contact at least one of the four satellites from virtually any terrestrial location, and in which the total of the four satellites can try to contact with virtually any terrestrial location. From certain terrestrial locations, of course, contact can be sought with more than one satellite, such as two or even three satellites, and preferably, a ground station will be sited at such a certain location.

The first ground station of a first operator is then situated in a first country and can try to contact, for example, the first, second and third satellite, the first ground station then having control over three first aerials. A first mobile station situated within the range of the first, second or third satellite in that case transmits the first satellite signal comprising a first identification code, such as, for example, a first ground-station identification code, to the first, second or third satellite which passes the first satellite signal comprising the first ground-station identification code, to the first ground station. The first satellite signal, comprising the first ground-station identification code and received via one of the three first aerials, is processed via the first processing arrangement, in response to which the first outgoing signal is generated. Under these circumstances, the first detection arrangement detects said first ground-station identification code, from which it then emerges that the first satellite signal, comprising the first ground-station identification code, is intended for the first ground station.

The second ground station of a second operator is then situated in a second country and can try to contact, for example, the third and fourth satellite, the second ground station then having control over two second aerials. A second mobile station situated within the range of the third or fourth satellite in that case transmits the second satellite signal, comprising a second identification code, such as, for example, a second ground-station identification code, to the third or fourth satellite which passes the second satellite signal, comprising the second ground-station identification code, to the second ground station. The second satellite signal, comprising the second ground-station identification code and received via one of the two second aerials, is processed via the second processing arrangement, in response to which the second outgoing signal is generated. Under these circumstances, the second detection arrangement detects the second ground-station identification code, from which it then emerges that the second satellite signal, comprising the second ground-station identification code, is intended for the second ground station.

If the user with his mobile station is situated, for example, within the range of the third satellite, he can generate either the first satellite signal, comprising the first ground-station identification code, or the second satellite signal, comprising the second ground-station identification code. In this case, the first ground station then responds, after detecting the first ground-station identification code, to the first satellite signal and the second ground station responds, after detecting the second ground-station identification code, to the second satellite signal. On the other hand, if the user with his mobile station is situated, for example, within the range of the fourth satellite, he must generate per se the second satellite signal, comprising the second ground-station identification code, in which case the second ground station responds, after detecting the second ground-station identification code, to said second satellite signal.

Such a ground-station system has, inter alia, the disadvantage that a user of a mobile station cannot manage according to one standard procedure over the entire world, but has to deal instead with a standard procedure which is different for each ground station.

SUMMARY OF THE INVENTION

The object of the invention is, inter alia, to provide a ground-station system of the type mentioned in the introduction, in which a user of a mobile station has to deal with one standard procedure over the entire world.

For this purpose, the ground-station system according to the invention has the characteristic that the first detection arrangement is provided with a first through-coupling arrangement for through-coupling the first aerial to the first processing arrangement in response to an identification code of a first type and for through-coupling the first aerial to a further second input of the second processing arrangement via a first link in response to an identification code of a second type.

By providing the first detection arrangement with the first through-coupling arrangement which through-couples the first aerial to the first processing arrangement in response to the identification code of the first type (such as, for example, the ground-station identification code of the first type) and which through-couples the first aerial to the further second input of the second processing arrangement via the first link in response to the identification code of the second type (such as, for example, the ground-station identification code of the second type), the result is achieved that, if the first ground station situated in a first country responds to first satellite signals, comprising the identification code of the first type (such as, for example, the ground-station identification code of the first type), the first satellite signals are consequently also actually processed via the first processing arrangement of the first ground station, whereas, if the first ground station responds to first satellite signals, comprising the identification code of the second type (such as, for example, the ground-station identification code of the second type), the first satellite signals, are not processed via the first processing arrangement of the first ground station, but are only transmitted by the first ground station via the first link to the second processing arrangement of the second ground station situated in a second country in order to be processed subsequently by the second processing arrangement at the site of the second ground station. In this case, the first link between the first ground station and the second ground station is a communication connection which can be formed, for example, by means of copper connections and/or glass-fiber connections and/or satellite connections and/or terrestrial radio connections.

The invention is based, inter alia, on the insight that, regardless of whether they comprise identification codes, such as, for example, ground-station identification codes, of the first or the second type, message-switched satellite signals, for example, can be received via a first aerial of a first ground station, in which case said satellite signals should generally be processed at the site of the first ground station if they comprise identification codes of the first type (such as, for example, ground-station identification codes of the first type), whereas the satellite signals can generally be transmitted without processing at the site of the first ground station via the first link to the second ground station in order to be processed there at the site, if they comprise identification codes of the second type (such as, for example, ground-station identification codes of the second type).

The problem of the user of a mobile station having to deal with a different standard procedure for each ground station is solved by processing the satellite signals either directly after reception at the site of a first ground station or indirectly after reception by the first ground station and after transmission to, and reception by, a second ground station at the site of the latter, depending on an identification code to be detected, such as, for example, a ground-station identification code.

Further advantages of the ground-station system according to the invention are the ability of one particular operator to create a so-called "global image" because a user of a mobile station can now manage with one ground-station identification code over the entire world and, to be specific, according to one standard procedure instead of a different standard procedure for each ground station. In addition, the ground-station system according to the invention offers an operator the possibility of providing a user with the same possibilities over the entire world, even in areas which were hitherto regarded as being territories of other operators, which will promote competition and will considerably reduce the dependence of an operator on other operators.

It should be pointed out that the possibilities also include, of course, also providing the first ground station with a further second processing arrangement so that satellite signals, comprising identification codes of the second type, such as, for example, ground-station identification codes of the second type, can also be processed at the site of the first ground station before they are transmitted via the first link. A disadvantage of this is the additional costs of the further second processing arrangement. It should, furthermore, be pointed out that, although known ground stations detect the ground-station identification codes associated with satellite signals, they do so only for the purpose of determining whether the satellite signals should be examined more closely or should be ignored. On the other hand, ground-stations according to the invention detect the ground-station identification codes associated with satellite signals for the purpose of determining whether the satellite signals should be processed or should be transmitted to other ground stations without processing. From this there emerges yet a further advantage of the ground-station system according to the invention, which makes use of the aerials of the ground stations in a more efficient way.

The ground-station system according to the invention, furthermore, offers at least two possibilities. Firstly, the identification code could correspond to the ground-station identification code, as already proposed above, and such as, for example, a LESID (local earth station identification code), in which case the user of a mobile station no longer needs to be acquainted with the information about the ground station via which communication should take place because such a user could then use the same ground-station identification code everywhere in the world. In that case, if the user is situated with his mobile station, for example, within the range of the first and/or the second satellite (which first and second satellite can contact only the first ground station situated in the first country), consequently he can now generate the first satellite signal, comprising the second ground-station identification code, in which case the first ground station responds to the first satellite signal after detecting the second ground-station identification code and in which case the first satellite signal is not processed via the first processing arrangement of the first ground station, but is only transmitted by the first ground station via the first link to the second processing arrangement of the second ground station in order to be processed subsequently by the second processing arrangement at the site of the second ground station. Secondly, the identification code could correspond to a mobile-station identification code, such as, for example, a MESID (mobile earth station identification code), in which case the user of a mobile station may still have to generate the correct ground-station identification code, but the desired ground station (and the desired processing arrangement associated therewith) is then selected on the basis of the mobile-station identification code. In this case, if the user is situated with his mobile station, for example, within the range of the first and/or the second satellite, consequently he can now generate the first satellite signal, which may comprise the first ground-station identification code and always comprises a second mobile-station identification code, in which case the first ground station responds to the first satellite signal after detecting the second mobile-station identification code and in which case the first satellite signal is not processed via the first processing arrangement of the first ground station, but is only transmitted by the first ground station via the first link to the second processing arrangement of the second ground station in order to be processed subsequently by the second processing arrangement at the site of the second ground station. Although a user of a mobile station may now therefore no longer be able to manage with one ground-station identification code over the entire world, he is still able to do so according to one standard procedure instead of a different standard procedure for each ground station. This second possibility (which will be chosen, for example, if a satellite controller does not agree to, or does not agree to in the interim, the first possibility) requires, for example, reference to a first internal table of the first ground station, a first portion of which first internal table is regularly updated, for example, via a network-coordinating station and a second portion of which first internal table can be loaded by an operator or a user of a mobile station with the required information, or requires, for example, reference by the first ground station to a first external table which is situated, for example, in the network-coordinating station. Such first tables have, for example, a left-hand column (for example the first portion) containing mobile-station identification codes and a right-hand column (for example the second portion) containing corresponding ground-station identification codes or operator codes. It goes without saying that both possibilities could also be combined, for example, by dealing with satellite signals originating from the first and second satellites in accordance with the first possibility and, for example, by dealing with signals originating from the third satellite (which third satellite can contact both the first ground station situated in the first country and the second ground station situated in the second country) in accordance with the second possibility. Furthermore, both possibilities could be combined, for example, by dealing with satellite signals originating from the first and second satellites in accordance with the first and/or the second possibility and, for example, by dealing with signals originating from the third satellite in accordance with the procedure already known.

A first embodiment of the ground-station system according to the invention has the characteristic that the first satellite signal comprises a destination code, the first ground station being provided with a further first detection arrangement for detecting the destination code, a further first through-coupling arrangement for through-coupling the first aerial to the first processing arrangement in response to a destination code of a first type and for through-coupling the first aerial to the further second input of the second processing arrangement via the first link in response to a destination code of a second type.

By providing the first ground station with the further first detection arrangement which detects the destination code associated with the first satellite signal and with the further first through-coupling arrangement which through-couples the first aerial to the first processing arrangement in response to the destination code of the first type and which through-couples the first aerial to the further second input of the second processing arrangement via the first link in response to the destination code of the second type, the result is achieved that the first ground station first of all investigates which further user the first satellite signal is destined for before the first satellite signal is processed or transmitted. This includes destination codes of the first type, for example, in the case of users having mobile stations who are situated within the range of the first ground station and it includes destination codes of the second type, for example, in the case of users having mobile stations who are situated outside the range of the first ground station. As a consequence of this, first satellite signals comprising identification codes of the second type and comprising destination codes of the first type are not actually transmitted via the first link to the second processing arrangement, but, on the contrary, are actually processed by the first processing arrangement. This has the advantage that traffic between two users of mobile stations who are both situated within the range of the first ground station, but whose calling user generates the identification code of the second type associated with the second ground station is actually processed at the site of the first ground station, which avoids excessive to-and-fro traffic via links.

Destination codes of the first type could also be associated, for example, with fixed terminals which are connected to a fixed terrestrial network and which are situated nearer the first ground station, and destination codes of the second type could be associated, for example, with fixed terminals which are connected to a fixed terrestrial network and which are situated nearer the second ground station. As a consequence of this, first satellite signals comprising identification codes of the second type and comprising destination codes of the first type are not actually transmitted via the first link to the second processing arrangement, but, on the contrary, are actually processed by the first processing arrangement. This has the advantage that traffic between a user of a mobile station and a fixed terminal situated nearer the first ground station is actually processed at the site of the first ground station, while the calling user generates the identification code of the second type associated with the second ground station, which avoids excessive to-and-fro traffic via links.

In this case, the destination code is detected by the further first detection arrangement of the first ground station, for example, by reference to a second internal table of the first ground station, which second internal table is regularly updated, for example, via the network-coordinating station, or, for example, by reference to a second external table by the first ground station, which second external table is situated, for example, in the network-coordinating station.

Preferably, the first ground station will detect destination codes associated with first satellite signals transmitted via the first satellite and destination codes associated with second satellite signals transmitted via the second satellite, and the second ground station will detect destination codes associated with fourth satellite signals transmitted via the fourth satellite. As regards third satellite signals to be transmitted via the third satellite which are either transmitted to the first ground station or to the second ground station, there is, of course, the advantageous possibility of allowing both ground stations to detect the destination codes, although, in this case, another advantageous possibility could be not to do precisely this.

A second embodiment of the ground-station system according to the invention has the characteristic that the second detection arrangement is provided with a second through-coupling arrangement for through-coupling the second aerial to the second processing arrangement in response to an identification code of a second type and for through-coupling the second aerial to a further first input of the first processing arrangement via a second link in response to an identification code of a first type.

By providing the second detection arrangement with the second through-coupling arrangement which through-couples the second aerial to the second processing arrangement in response to the identification code of the second type and which through-couples the second aerial to the further first input of the first processing arrangement via the second link in response to the identification code of the first type, the result is achieved that, if the second ground station responds to second satellite signals comprising the identification code of the second type (such as, for example, the ground-station identification code of the second type), the second satellite signals are consequently actually processed via the second processing arrangement of the second ground station, whereas, if the second ground station responds to second satellite signals comprising the identification code of the first type (such as, for example, the ground-station identification code of the first type), the second satellite signals are not processed via the second processing arrangement of said second ground station, but are only transmitted by the second ground station via the second link to the first processing arrangement of the first ground station in order to be processed subsequently by the first processing arrangement at the site of the first ground station. In this case, the second link between the first ground station and the second ground station is a communication connection which can be formed, for example, by means of copper connections and/or glass-fibre connections and/or satellite connections and/or terrestrial radio connections.

A third embodiment of the ground-station system according to the invention has the characteristic that the second satellite signal comprises a destination code, the second ground station being provided with a further second detection arrangement for detecting the destination code, a further second through-coupling arrangement for through-coupling the second aerial to the second processing arrangement in response to a destination code of a first type and for through-coupling the second aerial to the further second input of the first processing arrangement via the second link in response to a destination code of a second type.

By providing the second ground station with the further second detection arrangement which detects the destination code associated with the second satellite signal, and with the further second through-coupling arrangement which through-couples the second aerial to the second processing arrangement in response to the destination code of the first type and which through-couples the second aerial to the further second input of the first processing arrangement via the second link in response to the destination code of the second type, the result is achieved that the second ground station first of all investigates which further user the second satellite signal is destined for before the second satellite signal is processed or is transmitted. In this case, destination codes of the first type are associated, for example, with users having mobile stations who are situated within the range of the second ground station and destination codes of the second type are associated, for example, with users having mobile stations who are situated outside the range of the second ground station. As a consequence of this, second satellite signals, comprising identification codes of the first type and comprising destination codes of the first type, are not actually transmitted via the second link to the first processing arrangement, but, on the contrary, are actually processed by the second processing arrangement. This has the advantage that traffic between two users of mobile stations who are both situated within the range of the second ground station, but whose calling user generates the identification code of the first type associated with the first ground station is actually processed at the site of the second ground station, which avoids excessive to-and-fro traffic via links. In this case, the destination code is detected by the further second detection arrangement of the second ground station, for example, by reference to a third internal table of the second ground station, of which third internal table a first portion is regularly updated, for example, via the network-coordinating station and of which third internal table a second portion can be loaded with the required information, for example, by an operator or a user of a mobile station, or for example, by reference to a third external table by the second ground station, which third external table is situated, for example, in the network-coordinating station.

It goes without saying that the internal tables present in a ground station may coincide to a greater or lesser degree and the external tables present in a network-coordinating station may coincide to a greater or lesser degree.

The invention, furthermore, relates to a ground station for use in a ground-station system and provided with at least one aerial for the reception of a satellite signal comprising an identification code, a processing arrangement comprising an input, coupled to the aerial, for the reception and processing of the satellite signal and comprising an output for the generation of a first outgoing signal, and a detection arrangement for detecting the identification code.

The ground station according to the invention has the characteristic that the detection arrangement is provided with a through-coupling arrangement for through-coupling the aerial to the processing arrangement in response to an identification code of a first type and for through-coupling the aerial to a link coupled to a further ground station for feeding at least one portion of the satellite signal to the further ground station in response to an identification code of a second type.

A first embodiment of the ground station according to the invention has the characteristic that the satellite signal comprises a destination code, the ground station being provided with a further detection arrangement for detecting the destination code, a further through-coupling arrangement for through-coupling the aerial to the processing arrangement in response to a destination code of a first type and for through-coupling the aerial to the link coupled to the further ground station in response to a destination code of a second type.

The invention, furthermore, relates to a device for use in a ground station provided with an aerial for the reception of a satellite signal comprising an identification code, which device is provided with a processing arrangement comprising an input which can be coupled to the aerial for the reception and processing of the satellite signal and comprising an output for the generation of a first outgoing signal, and a detection arrangement for detecting the identification code.

The device according to the invention has the characteristic that the detection arrangement is provided with a through-coupling arrangement for through-coupling the aerial to the processing arrangement in response to an identification code of a first type and for through-coupling the aerial to a link coupled to a further ground station for feeding at least a portion of the satellite signal to said further ground station in response to an identification code of a second type.

A first embodiment of the device according to the invention has the characteristic that the satellite signal comprises a destination code, the device being provided with a further detection arrangement for detecting the destination code, and a further through-coupling arrangement for through-coupling the aerial to the processing arrangement in response to a destination code of a first type and for through-coupling the aerial to the link coupled to the further ground station in response to a destination code of a second type.

The invention also relates, furthermore, to a method for processing a satellite signal originating from a satellite by a ground station, which method comprises the steps of the reception of the satellite signal comprising an identification code via an aerial of the ground station, the feeding of the satellite signal to a processing arrangement of the ground station, the processing of the satellite signal by the processing arrangement of the ground station and generation of a first outgoing signal, and the detection of the identification code by a detection arrangement of the ground station.

The method according to the invention has the characteristic that the method comprises the steps of the through-coupling of the aerial of the ground station to the processing arrangement of the ground station in order to process the satellite signal via the processing arrangement of the ground station in response to an identification code of a first type, and the through-coupling of the aerial of the ground station to a link coupled to a further ground station for feeding at least a portion of the satellite signal to the further ground station in order to process at least the portion of the satellite signal via a further processing arrangement of the further ground station in response to an identification code of a second type.

A first embodiment of the method according to the invention has the characteristic that the method comprises the steps of the detection of a destination code associated with the satellite signal by a further detection arrangement of the ground station, the through-coupling of the aerial of the ground station to the processing arrangement of the ground station in order to process the satellite signal via the processing arrangement of the ground station in response to a destination code of a first type, and the through-coupling of the aerial of the ground station to the link coupled to the further ground station for feeding at least the portion of the satellite signal to said further ground station in order to process at least the portion of the satellite signal via the further processing arrangement of the further ground station in response to a destination code of a second type.

From WO 92/19050 a global satellite communication system with geographic protocol conversion is known. This document substantially discloses the transmitting of messages to mobile users. Therefore, the invention relating to the transmitting of signals from a mobile user via a satellite to a ground station is not known from this document.

From GB 2 275588 a global satellite communication system is known. In order to determine and register the location of a mobile terminal, the mobile terminal transmits an identification signal, indicating the satellite or the ground station via which it may be reached. This information is stored in data storage means. When a call for the mobile terminal comes in, the information is used to route the call, correctly.

References

WO 92/19050
WO 92/00636
GB 2 275588

All references are deemed to have been incorporated in this patent application.

BRIEF DESCRIPTION OF THE DRAWINGS

The invention will be explained in greater detail by reference to an exemplary embodiment shown in the figure. In the figure.

Figure 1:
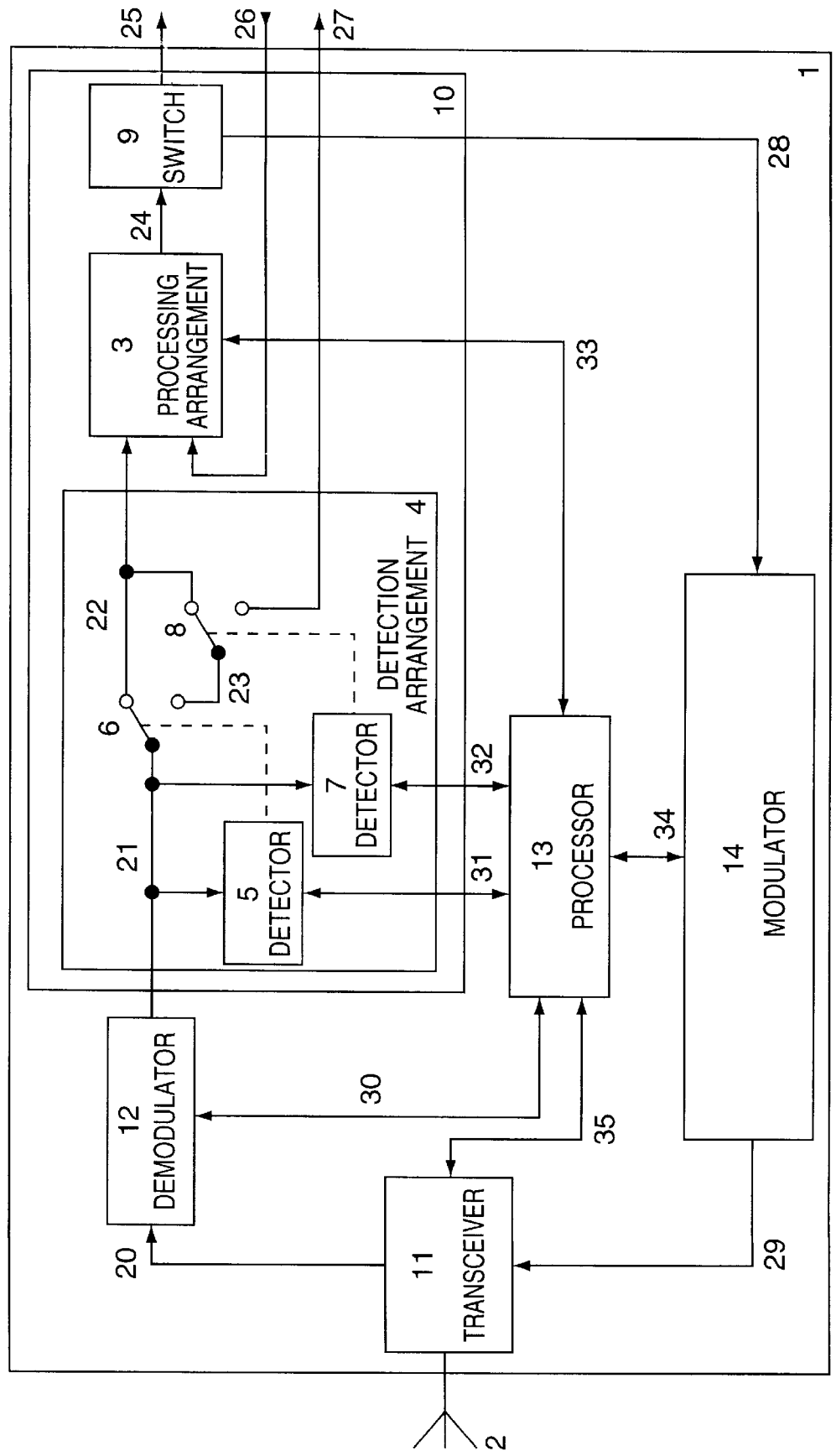
FIG. 1 shows a ground station according to the invention for which is coupled via a control connection 34 to a control input/output of modulator 14. An output of demodulator 12 is coupled via a connection 21 to an input of a device 10, a first output of which can be coupled via a connection 25 to a terrestrial network not shown in FIG. 1 and a second output of which is coupled via a connection 28 to an input of modulator 14 and a link input of which can be coupled via link 26 to another ground station not shown in FIG. 1 and a link output of which can be coupled via a link 27 to the other ground station not shown in FIG. 1 and a first or second or third control input/output of which is coupled via a control connection 31 or 32 or 33, respectively, to processor 13.

Device 10 comprises a detection arrangement 4 and a processing arrangement 3 and a switch 9. Detection arrangement 4 is provided with an input which is coupled via connection 21 to the input of device 10 and is provided with a first output which is coupled via a connection 22 to a first input of processing arrangement 3 and is provided with a second output which is coupled via link 27 to the link output of device 10. A first or second control input/output of detection arrangement 4 is coupled via connection 31 or 32, respectively, to the first or second control input/output, respectively, of device 10. A second input of processing arrangement 3 is coupled via link 26 to the link input of device 10 and a control input/output is coupled via control connection 33 to the third control input/output of device 10. An output of processing arrangement 3 is coupled via a connection 24 to an input of switch 9, a first output of which is coupled via connection 25 to the first output of device 10 and a second output of which is coupled via connection 28 to the second output of device 10.

Detection arrangement 4 comprises a first detector 5, an input of which is coupled via connection 21 to the input of detection arrangement 4 and a control input/output of which is coupled via connection 31 to the first control input/output of detection arrangement 4, and comprises a second detector 7 which functions as a further detection arrangement and an input of which is coupled via connection 21 to the input of detection arrangement 4 and a control input/output of which is coupled via connection 32 to the second control input/output of detection arrangement 4. Detection arrangement 4, furthermore, comprises a first changeover switch 6 which is controlled by first detector 5 and functions as a through-coupling arrangement and a main contact of which is coupled via connection 21 to the input of detection arrangement 4 and a first switch contact of which is coupled via connection 22 to the first output of detection arrangement 4 and a second switch contact of which is coupled via a connection 23 to a main contact of a second changeover switch 8 which is controlled by second detector 7 and functions as a further through-coupling arrangement and a first switch contact of which is coupled via connection 22 to the first switch contact of first changeover switch 6 and to the first output of detection arrangement 4 and a second switch contact of which is coupled via link 27 to the second output of detection arrangement 4.

The operation of the ground station 1 according to the invention which is shown in FIG. 1 and comprises the device 10 according to the invention and which is for use in a ground-station system according to the invention, which ground-station system is provided with at least the ground station 1 and the other ground station not shown in FIG. 1, is as follows. In this connection, it is assumed that ground station 1 can communicate with a first, a second and a third satellite and that the other ground station can communicate with the third and a fourth satellite, satellite signals to be transmitted via the first, second, third or fourth satellite being referred to as first, second, third or fourth satellite signals, respectively.

A first user who is situated with his mobile station within the range of the first satellite generates, for example, a first satellite signal comprising an identification code of a first type and a destination code. Said first satellite signal is passed to ground station 1, which forms the property of a first operator, by the first satellite, after any necessary conversion. Said first satellite signal is fed via aerial 2 to transceiver 11 which feeds it via connection 20 to demodulator 12, transceiver 11 informing processor 13 via control connection 35 and demodulator 12 informing processor 13 via control connection 30 of the arrival of the first satellite signal. Via connection 21, the demodulated first satellite signal is fed from demodulator to the first detector 5 which is situated in detection arrangement 4 and which detects the identification code of the first type, and to the second detector 7 which is situated in detection arrangement 4 and which detects the destination code. Via control connection 31, first detector 5 informs processor 13 of the identification code of the first type, and via control connection 32, second detector 7 informs processor 13 of the destination code. In response to the detection of the identification code of the first type, first detector 5 controls changeover switch 6 in such a way that the main contact is connected through to the first switch contact, as a consequence of which connection 21 is connected through to connection 22 and the position of the changeover switch 8 controlled by second detector 7 in response to the detected destination code becomes of subordinate importance. Via connection 22, the first satellite signal flows to processing arrangement 3 which processes the first satellite signal, such as, for example, a message-switched satellite signal. Via control connection 33, processing arrangement 3 informs processor 13 of this. The processed first satellite signal is then fed via connection 24 to switch 9 which either detects the destination code yet again or is informed about said destination code via detector 7 and/or processor 13 and, in response thereto, either feeds the processed first satellite signal via connection 25 to the terrestrial network for feeding to another user characterized by the destination code or feeds the processed first satellite signal via connection 28 to modulator 14. Via control connection 35 modulator 14 informs processor 13 of this, after which the modulated first satellite signal is fed via connection 29 to transceiver 11, which informs processor 13 of this via control connection 35 and transmits the modulated first satellite signal via aerial 2 to the first, second or third satellite for feeding to another user characterized by the destination code. Because the first user generates the first satellite signal comprising the identification code of the first type, from which identification code of the first type it is evident that said first user is a subscriber of the first operator, said first satellite signal is processed in ground station 1, only after which does feeding to the other user take place. The identification code of the first type is, for example, a ground-station identification code of the first type, or operator code of the first type, or is, for example, a mobile-station identification code of the first type, or an MESID (mobile earth station identification code) of the first type.

A second user who is situated with his mobile station within the range of the first satellite generates, for example, a first satellite signal comprising an identification code of a second type and a destination code of a second type. Said first satellite signal is passed by the first satellite, after any necessary conversion, to ground station 1, which forms the property of the first operator. Via aerial 2, said first satellite signal is fed to transceiver 11, which feeds it via connection 20 to demodulator 12, transceiver 11 informing processor 13 via control connection 35 and demodulator 12 informing processor 13 via control connection 30 of the arrival of the first satellite signal. Via connection 21, the demodulated first satellite signal is fed from demodulator to the first detector 5 which is situated in detection arrangement 4 and which detects the identification code of the second type, and to the second detector 7 which is situated in detection arrangement 4 and which detects the destination code of the second type. Via control connection 31, first detector 5 informs processor 13 of the identification code of the second type, and via control connection 32, second detector 7 informs processor 13 of the destination code of the second type. In response to the detection of the identification code of the second type, first detector 5 sets changeover switch 6 in such a way that the main contact is connected through to the second switch contact, as a result of which connection 21 is connected through to connection 23. In response to the detection of the destination code of the second type, second detector 7 sets changeover switch 8 in such a way that the main contact is connected through to the second switch contact, as a result of which connection 23 is connected through to link 27. Via link 27, the first satellite signal, such as, for example, a message-switched satellite signal, flows in the unprocessed state to the other ground station, which forms the property of a second operator, where the first satellite signal is then processed on site in order to feed it to another user characterized by the destination code of the second type. Because the second user generates the first satellite signal comprising the identification code of the second type, from which identification code of the second type it is evident that said second user is a subscriber of the second operator, said first satellite signal is not processed in ground station 1 but is transmitted in the unprocessed state to the other ground station in order to be processed there on site, only after which does feeding to the other user take place. The identification code of the second type is, for example, a ground-station identification code of the second type, or operator code of the second type, or is, for example, a mobile-station identification code of the second type, or an MESID (mobile earth station identification code) of the second type.

A third user who is situated with his mobile station within the range of the first satellite generates, for example, a first satellite signal comprising an identification code of a second type and a destination code of a first type. Said first satellite signal is passed by the first satellite, after any necessary conversion, to ground station 1, which forms the property of the first operator. Via aerial 2, said first satellite signal is fed to transceiver 11, which feeds it via connection 20 to demodulator 12, transceiver 11 informing processor 13 via control connection 35 and demodulator 12 informing processor 13 via control connection 30 of the arrival of the first satellite signal. Via connection 21, the demodulated first satellite signal is fed from demodulator to the first detector 5 which is situated in detection arrangement 4 and which detects the identification code of the second type and to the second detector 7 which is situated in detection arrangement 4 and which detects the destination code of the first type. Via control connection 31, first detector 5 informs processor 13 of the identification code of the second type, and via control connection 32, second detector 7 informs processor 13 of the destination code of the first type. In response to the detection of the identification code of the second type, first detector 5 sets changeover switch 6 in such a way that the main contact is connected through to the second switch contact, as a result of which connection 21 is connected through to connection 23. In response to the detection of the destination code of the first type, second detector 7 sets changeover switch 8 in such a way that the main contact is connected through to the first switch contact, as a result of which connection 23 is connected through to connection 22. Via connection 22, the first satellite signal flows to processing arrangement 3, which processes the first satellite signal, such as, for example, a message-switched satellite signal. Via control connection 33 processing arrangement 3 informs processor 13 of this. The processed first satellite signal is then fed via connection 24 to switch 9, which either detects the destination code of the first type yet again or is informed via second detector 7 and/or processor 13 of said destination code of the first type and, in response thereto, feeds the processed first satellite signal to modulator 14, for example, via connection 28. Via control connection 35, modulator 14 informs processor 13 of this, after which the modulated first satellite signal is fed via connection 29 to transceiver 11, which informs processor 13 of this via control connection 35 and which transmits the modulated first satellite signal via aerial 2 to the first, second or third satellite for feeding to another user characterized by the destination code of the first type. While the third user generates the first satellite signal comprising the identification code of the second type, from which identification code of the second type it is evident that said third user is a subscriber of the second operator, said first satellite signal is not actually transmitted in the unprocessed state to the other ground station in order to be processed there on site, but the first satellite signal comprising the identification code of the second type is actually processed in ground station 1, after which feeding to the other user takes place, because the destination code is of the first type, which indicates that the other user is situated, for example, within the range of the first or the second satellite.

If the identification code is a ground-station identification code or operator code, first detector 5 can use said identification code directly to set changeover switch 6. If the identification code is, on the other hand, a mobile-station identification code, or an MESID (mobile earth station identification code), a first table should generally be referred to, of which first table a first portion is regularly updated, for example, via a network-coordinating station (NCS) and of which first table a second portion can be loaded with the required information, for example, by an operator or a user of a mobile station. Such first tables have, for example, a left-hand column (for example, the first portion) containing mobile-station identification codes and a right-hand column (for example, the second portion) containing corresponding ground-station identification codes or operator codes. Such a first table may be situated in the ground station itself as a so-called internal table (for example, as a component of processor 13 in FIG. 1) or be situated in the NCS (network-coordinating station) as a so-called external table, in which case continuous communication does have to take place between the ground station and the NCS. If a user of a mobile station obtains access to the system, for example, via a first or second predetermined number, a first or second ground-station identification code or operator code, respectively, could be set by the system automatically in response thereto. A user of a mobile station can then also set a ground-station identification code or operator code he desires himself, for example, via a predetermined number and a unique code and pin code.

The destination code is, for example, a specific identification of the other user, such as, in a first case, the telephone number of the fixed terminal of the other user or, in a second case, the number of the mobile station of said other user. A destination code of a first type then implies, in the first case, that the telephone number, or a portion thereof (such as a country code) relates to a fixed terminal which is nearer ground station 1, and, in the second case, it implies that the mobile station of the other user is situated within the range of the first, second or third satellite. A destination code of a second type then implies, in the first case, that the telephone number or a portion thereof (such as a country code) relates to a fixed terminal which is nearer the other ground station, and, in the second case, it implies that the mobile station of the other user is situated within the range of the third or fourth satellite. Because users of mobile stations can move with their mobile station, a second table will in general need to be referred to, which second table has, for example, a left-hand column containing numbers of mobile stations and telephone numbers of fixed terminals and has a right-hand column containing locations. In general, said location is stored automatically. Such a second table may be situated in the ground station itself as a so-called internal table (for example as a component of processor 13 in FIG. 1) or it is situated in the NCS (network-coordinating station) as a so-called external table, in which case continuous communication does have to take place between the ground station and the NCS.

Instead of a table containing two columns (containing, for example, identification codes or destination codes in the left-hand column and, for example, ground-station identification codes or operator codes or locations in the right-hand column) a table having only one column (the left-hand column) could of course be used, in which case it is then necessary to investigate whether, for example, an identification code or a destination code is situated in said one column or not, for example by confirming an equality or inequality, and in which case if it is present (equality) a first operation (for example, selection of a first ground-station identification code or operator code or location) is then subsequently carried out and, if it is absent (inequality), a second operation (for example, selection of a second ground-station identification code or operator code or location) is carried out.

The detection arrangement 4 shown in FIG. 1 comprises first detector 5 and the changeover switch 6, which functions as a through-coupling arrangement, and it preferably comprises second detector 7 and the second changeover switch 8, which functions as a further through-coupling arrangement. Of course, the two changeover switches 6 and 8 could also alternatively be seen separately from the detection arrangement 4, in which case detection arrangement 4 comprises only first detector 5 and, preferably, second detector 7.

The transceiver 11 demodulator 12 and modulator 14 shown in FIG. 1 will generally have more functions known to the person skilled in the art than those which have hitherto been discussed. Thus, satellite signals arriving via aerial 2 will be time-multiplexed and/or frequency-multiplexed and they then have to be demultiplexed, and signals to be sent via aerial 2 will have to be time-multiplexed and/or frequency-multiplexed. In this connection, identification codes and destination codes can be indicated both by means of, for example, a header and by means of a predetermined, defined location. Furthermore, a portion of the signal content of satellite signals arriving via aerial 2 will be destined for processor 13, and another portion will be destined for device 10, and a portion of a signal content arriving via connection 28 at modulator 14 will generally have to be combined with another portion of a signal content arriving via control connection 34 at modulator 14.

Given the above, it will be clear that, for each ground station, device 10, transceiver 11, demodulator 12 and modulator 14 will have to be implemented, for example, in duplicate, triplicate, quadruplicate or quintuplicate, and that aerial 2 is implemented as a separate transmitting aerial and receiving aerial. Of course, at least one aerial is always present for each satellite to be reached.

The links shown in FIG. 1 as an incoming link 26 and an outgoing link 27 are communication connections which can be formed, for example, by means of copper connections and/or glass-fibre connections and/or satellite connections and/or terrestrial radio connections. If the two respective links 26 and 27 are formed by means of satellite connections, they will generally have to be coupled to at least one of the devices 10 or at least one of the modulators 14, respectively.

What is claimed is:

1. A ground-station system comprising:
   a first ground station having:
      a first aerial for reception of a first satellite signal comprising an identification code and a destination code;
      a first processing arrangement having a first input, coupled to the first aerial, for reception and processing of the first satellite signal and having a first output for generation of a first outgoing signal; and
      a first detection arrangement, operative in conjunction with the first processing arrangement, for detecting the identification code; and
   a second ground station having:
      a second aerial for reception of a second satellite signal comprising an identification code;
      a second processing arrangement having a second input, coupled to the second aerial, for reception and processing of the second satellite signal and having a second output for generation of a second output signal; and
      a second detection arrangement, operative in conjunction with the second processing arrangement, for detecting the identification code; and
   wherein:
      the first detection arrangement comprises a first through-coupling arrangement for through-coupling the first aerial to the first processing arrangement in response to the identification code being a first type and for through-coupling the first aerial to a further second input of the second processing arrangement via a first link in response to the identification code being a second type; and
      the first ground station further comprises:
         a further first detection arrangement for detecting the destination code; and
         a further first through-coupling arrangement, responsive to the further first detection arrangement, for through-coupling the first aerial to the first processing arrangement in response to the destination code being a first type and for through-coupling the first aerial to the further second input of the second processing arrangement via the first link in response to the destination code being a second type.

2. The ground-station system according to claim 1, wherein:
   the second detection arrangement comprises a second through-coupling arrangement for through-coupling the second aerial to the second processing arrangement in response to the identification code being the second type and for through-coupling the second aerial to a further first input of the first processing arrangement via a second link in response to the identification code being the a first type; and
   the second ground station further comprises:
      a further second detection arrangement for detecting the destination code; and
      a further second through-coupling arrangement, responsive to the further second detection arrangement, for through-coupling the second aerial to the second processing arrangement in response to the destination code being the first type and for through-coupling the second aerial to the further second input of the first processing arrangement via the second link in response to the destination code being the second type.

3. A ground-station system comprising
   a first ground station having:
      a first aerial for reception of a first satellite signal comprising an identification code;
      a first processing arrangement having a first input, coupled to the first aerial, for reception and processing of the first satellite signal and having a first output for generation of a first outgoing signal; and
      a first detection arrangement, operative in conjunction with the first processing arrangement, for detecting the identification code; and
   a second ground station having:
      a second aerial for reception of a second satellite signal comprising an identification code and a destination code;
      a second processing arrangement having a second input, coupled to the second aerial, for reception and processing of the second satellite signal and having a second output for generation of a second output signal; and
      a second detection arrangement, operative in conjunction with the second processing arrangement, for detecting the identification code; and
   wherein:
      the first detection arrangement comprises a first through-coupling arrangement for through-coupling the first aerial to the first processing arrangement in response to the identification code being a first type and for through-coupling the first aerial to a further second input of the second processing arrangement via a first link in response to the identification code being a second type;
      the second detection arrangement comprises a second through-coupling arrangement for through-coupling the second aerial to the second processing arrangement in response to the identification code being the second type and for through-coupling the second aerial to a further first input of the first processing arrangement via a second link in response to the identification code being the first type; and
   the second ground station further comprises:
      a further second detection arrangement for detecting the destination code; and
      a further second through-coupling arrangement for through-coupling the second aerial to the second processing arrangement in response to the destination code being a first type and for through-coupling the second aerial to the further second input of the first processing arrangement via the second link in response to the destination code being a second type.

4. A ground station, for use in a ground station system, comprising:
   an aerial for reception of a satellite signal comprising an identification code and a destination code;
   a processing arrangement comprising an input, coupled to the aerial, for reception and processing of the satellite signal and having an output for generating a first outgoing signal;

a detection arrangement, operative in conjunction with the processing arrangement, for detecting the identification code, wherein the detection arrangement comprises a through-coupling arrangement for through-coupling the aerial to the processing arrangement in response to the identification code being a first type and for through-coupling the aerial to a link coupled to a further ground station for feeding a portion of the satellite signal to said further ground station in response to the identification code being a second type;

a further detection arrangement for detecting the destination code; and a further through-coupling arrangement, responsive to the further detection arrangement, for through-coupling the aerial to the processing arrangement in response to the destination code being a first type and for through-coupling the aerial to the link coupled to the further ground station in response to the destination code being a second type.

5. A device for use in a ground station which is provided with an aerial for reception of a satellite signal comprising an identification code and a destination code, wherein the device comprises:

processing arrangement having an input which can be coupled to the aerial for reception and processing of the satellite signal and having an output for generating a first outgoing signal;

a detection arrangement, operative in conjunction with the processing arrangement, for detecting the identification code, wherein the detection arrangement has a through-coupling arrangement for through-coupling the aerial to the processing arrangement in response to the identification code being a first type and for through-coupling the aerial to a link coupled to a further ground station for feeding a portion of the satellite signal to said further ground station in response to the identification code being a second type;

a further detection arrangement for detecting the destination code; and a further through-coupling arrangement, responsive to the further detection arrangement, for through-coupling the aerial to the processing arrangement in response to the destination code being a first type and for through-coupling the aerial to the link coupled to the further ground station in response to the destination code being a second type.

6. A method for processing a satellite signal originating from a satellite by a ground station, wherein the method comprises the steps of:

receiving the satellite signal, having an identification code and a destination code, via an aerial of the ground station so as to define a received satellite signal;

feeding the received satellite signal to a processing arrangement of the ground station;

processing the received satellite signal by the processing arrangement of the ground station and generating a first outgoing signal;

detecting the identification code by a detection arrangement of the ground station;

through-coupling the aerial of the ground station to the processing arrangement of the ground station in order to process the satellite signal via the processing arrangement of the ground station in response to the identification code being a first type; and through-coupling the aerial of the ground station to a link coupled to a further ground station for feeding a portion of the satellite signal to said further ground station in order to process the portion of the satellite signal via a further processing arrangement of the further ground station in response to the identification code being a second type;

detecting the destination code associated with the satellite signal by a further detection arrangement of the ground station;

through-coupling the aerial of the ground station to the processing arrangement of the ground station in order to process the satellite signal via the processing arrangement of the ground station in response to the destination code being a first type; and through-coupling the aerial of the ground station to the link coupled to the further ground station for feeding the portion of the satellite signal to said further ground station in order to process the portion of the satellite signal via the further processing arrangement of the further ground station in response to the destination code being a second type.

* * * * *